United States Patent

[11] 3,627,565

[72] Inventor Edwin P. Plueddemann
c/o Dow Corning Corp., Midland, Mich. 48460
[21] Appl. No. 848,731
[22] Filed Aug. 8, 1969
[45] Patented Dec. 14, 1971

[54] MIXTURES OF ZIRCONYL SALTS AND TRIALKOXYSILYLPROPYLAMINES AS COUPLING AGENTS
7 Claims, No Drawings

[52] U.S. Cl.................................................. 117/72,
117/76 T, 117/126 GN, 117/126 GF, 117/121,
260/429.3, 117/126 GE
[51] Int. Cl....................................................C03c 25/02,
B32b 17/04

[50] Field of Search........................................... 117/126
GF, 126 GN, 121, 72, 76 T; 260/429.3

[56] References Cited
UNITED STATES PATENTS
3,418,094  12/1968  Marsden et al. ...............  117/126 X Primary Examiner—William D. Martin
Assistant Examiner—David Cohen
Attorneys—Robert F. Fleming, Jr., Laurence R. Hobey, Harry D. Dingman and Norman E. Lewis ABSTRACT: The bond strength between solid inorganic materials, such as glass, and certain organic resins, such as epoxies, is strengthened by treatment of the solid with a mixture of a water soluble zirconyl salt and a gamma-trialkoxysilylpropylamine prior to the formation of the bond.

MIXTURES OF ZIRCONYL SALTS AND TRIALKOXYSILYLPROPYLAMINES AS COUPLING AGENTS

This invention relates to the treatment of solid inorganic materials in order to obtain superior bonding of these materials to organic resins. In one aspect, the invention relates to the treatment of fibrous glass which is combined with resinous material to form high-strength composites. In another aspect, the invention relates to a single treatment which enhances the handling properties of glass fibers while at the same time improving the physical properties of composites fabricated from the treated glass and organic resins.

There are a number of products in which an organic resin is bonded to an inorganic solid. Such bonding is an integral step in the production of many structural materials, glass-reinforced plastics, laminates and the like. The strength of the bond between the solid reinforcement or substrate and the resin is often determinative of the ultimate strength of the article. The strength of this bond is influenced by several factors, including wettability of the solid surface by the resin and the presence of chemical bonding between the surface and the resin. In the fabrication of these bonded products, ease in handling the reinforcing solid is especially desirable. To obtain ease in handling of glass fibers, these materials are often coated with an antistatic agent, such as a transition metal salt. Examples of these metal salts as used in sizing compositions are given in British Pat. 1,138,528.

It has been found that the combination of certain of these transition metal salts with amino-functional silanes provides superior bond strengths in the reinforcement of certain organic resins.

Accordingly, it is an object of the invention to provide a method of enhancing the strength of reinforced plastic articles.

It is another object of the invention to provide, coated glass fibers which exhibit an improved receptivity to organic resins.

A further object of the invention is to provide, as article of manufacture, a high strength composite article of reinforced resinous materials.

These and other objects of the invention will be apparent to one skilled in the art upon consideration of the following specification and appended claims.

The invention provides a method of improving the receptivity of solid inorganic materials for organic resins which comprises contacting the solid with an aqueous solution containing from 0.1 to 5 weight percent of a mixture consisting essentially of 1 to 10 molar parts of a water-soluble zirconyl salt and 1 to 10 molar parts of a water-soluble gamma-tri-alkoxysilylpropylamine.

The treated solid material is used to reinforce organic resins which are capable of reacting with the amine functionality of the coating. Illustrative of such resins are know commercial phenolic resins, both resols and novalac; amino resins, which are the reaction products of urea or melamine with formaldehyde, polyamides which are the reaction products of dianhydrides with diamines; such as poly(hexamethylene, diamide, adipate), poly(benzedene, fumarate), and poly(3-aminopropionic acid); epoxy resins, such as condensation products of epichlorohydrin and bis-(para-hydroxyphenol)-dimethylmethane;urethane resins, including the adducts of organopolyisocyanates and polyhydric alcohols such as the adduct of paraphenylene diisocyanate and polyethylene gylcol; polyesters, including the gylcerol-phthalate resins, the glycerol-maleate resins and glycerol-terephthalate resins, as well as corresponding alcohol-, acid- and oil-modified products, and alkyd resins, which are the reaction products of a saturated polybasic acid and a polyol.

Composite articles of manufacture, in which these resins are bonded to solid surface which have been treated with the solution of zirconyl salt and amine-functional trialkoxysilane, exhibit superior strength when compared to articles in which the solid surface has been treated with other metal salts and the same silane.

Water-soluble zirconyl salts, suitable for practice of the invention, include ammonium zirconyl carbonate, zirconium acetate, basic zirconyl chloride, zirconium oxychloride, and zirconyl nitrate.

Any water-soluble gamma-trialkoxysilylpropylamine can be used in the practice of the invention. These amines include $(C_2H_5O)_3SiCH_2CH_2CH_2NH_2$, $(C_4H_9O)_3SiCH_2CH_2CH_2NH(CH_3)$, $(CH_3O)_3SiCH_2CH_2CH_2N(CH_3)_2$, $(C_3H_7O)_3SiCH_2CH_2CH_2NHCH_2CH_2NH_2$, $(CH_3O)_3SiCH_2CH_2CH_2N(CH_2CH_2OH)_2$, and $(CH_3O)_3SiCH_2CH_2CH_2NH(CH_2CH_2OH)$. These amine-functional silanes are well known in the art. The trimethoxysilanes are preferred because of their ready commercial availability.

The components of the coupling agent are mixed in water and form stable aqueous solution. The acidic zirconyl salts may require the addition of acid in an amount equivalent to the amine in order to obtain a stable solution. The exact nature of the aqueous solution is not known, but it is apparent from testing that the zirconyl salt-amine mixture provides a more polar surface than amino-functional silane alone does. This results in improved wettability of that surface by organic resins which is directly related to enhanced physical strength obtained in the composite formed from the treated solids.

Any solid inorganic material can be used in this application, for example, glass cloth or fiber, powdered glass, rock silicas, or clay. Sheets of glass and silicone resins are also useful. Metals which can be used are aluminum, copper, silver, steel, iron, nickel and the like. These metals can be used in the form of sheeting, wire, rod, filings or powder. Solid material in the form of metal oxides such as powdered aluminum, iron oxide or titanium dioxide are also suitable as reinforcing solids.

The zirconyl salt-amine solution can be applied to the surface of the solid by any suitable method such as dipping, spraying, or brushing. As previously discussed it is preferred to apply the solution in a dilute form from 0.1 to 5 weight percent. This is more in the nature of economic preference since higher concentrations of the materials in solution are operable but give no further enhancement of bond strengths. Treatment of glass fibers in accordance with the invention not only enhances bond strength but improves the handling characteristics of the fiber. Thus the fibers are more easily chopped and the weaving of the material onto glass cloth is facilitated. Other conventional treating materials, such as sizing agents and lubricants, can be utilized in conjunction with the desired solution.

The thermoplastic organic resins, such as polyamide, are bonded to the treated solid by heating the polymer to above its softening temperature and contacting the reinforcing solid. The bond with thermosetting polymers, for example epoxy resins, is effected by mixing the liquid resin and treated material thereafter curing the composite. The composite article thus formed consists of the solid inorganic material having its surface treated with the defined mixture of zirconyl salts and gamma-trialkoxysilylpropylamine which is bonded to organic resin, the composite article can take a variety of forms. A single piece of the solid material can be bonded with the resin to form a continuous two dimensional bond. A laminate of alternating sheets of the reinforcing material and resin can also be made, or granules or fibers of the solid can be dispersed throughout a resin.

The following examples are illustrative only, and should not be construed as limiting the invention, which is properly delineated in the appended claims.

EXAMPLE 1

Equimolar mixtures of various transition metal salts with the same amino functional trialkoxysilane were dissolved in acidified water to give an aqueous solution containing a 5 percent solids. Films of these solutions were coated onto clean aluminum panels and dried at 100° for 15 minutes. The primed aluminum panels were then coated with a commercially available 2-part urethane paint. The painted panels were air dried for 30 minutes and then baked at 90° C. for 45 minutes. Adhesion of the urethane paint was tested dry at room temperature and in boiling water. Water sensitivity of the paint-aluminum-bond was indicated by formation of blisters. The time at which blisters were observed for each film were recorded. The following table lists the particular transition metal salt component of the equimolar mixture of metal salt and $(CH_3O)_3SiCH_2CH_2CH_2NHCH_2CH_2NH_2$ and the time at which blisters on the treated panels were formed.

Primed Aluminum Panels

| Transition metal salts with $(CH_3O)_3SiCH_2CH_2CH_2$ | Time to Form Paint Blisters (minutes) $NHCH_2CH_2NH_2$ |
|---|---|
| $CrCl_3$ | 5 |
| $FeCl_3$ | 5 |
| $FeCl_2$ | * |
| $CoCl_2$ | 5 |
| $NiCl_2$ | * |
| $Cu(NO_3)_2$ | 5 |
| $ZnCl_2$ | * |
| $Zn(C_2H_3O_2)_2$ | 5 |
| $HZrOOH(C_2H_3O)_2$ | 30 |
| $(NH_4)_3ZrOH(CO_3)_3$ | >30 |

\* Paint did not adhere to these prime panels.
\*\* Applied from unacidified solution.

These metal salts are representative of the material available in the prior art, it will be noted that only the combination of zirconium salts with the silane coupling agent impart equal or improved adhesion and water resistance.

EXAMPLE 2

An equimolar mixture of the silane utilized in the example 1 and $(NH_4)_3ZrOH(CO_3)_3$ was added to water to form a 0.5 weight percent aqueous solution. Various other mixtures of zirconyl salts and the silane in acidified water were used to form treating solution. For purposes of comparisons, a mixture of equimolar amounts of chromium chloride and the silane was added to water to form a 0.5 percent treating solution. The different solutions were used to treat samples of heat cleaned E-glass, type 181, glass cloth. After immersion in a solution, the glass cloth was air dried for 30 minutes at room temperature and then heated 7 minutes at 110° C. Portions of the treated glass cloth were laminated with an aromatic amine-cured epoxy resin. The treated cloth was impregnated with the organic resin and the impregnated cloth was then stacked into a 14-ply laminate. The epoxy resin employed was a commercial material consisting of a condensation product of two moles of epichlorohydrin and one mol of bis(parahydroxylphenyl)dimethylmethane. This polymer had an epoxide equivalent weight of 187 to 193. The catalyst employed was metaphenylenediamine, which was used in amount 13 percent by weight based on the weight of the epoxy resin.

The epoxy resin laminates were cured in a press for 30 minutes at 150° C. The flexural strength of cured product was determined (dry strength). The samples of the laminates were then immersed in boiling water and tested for flexural strength after 2, 48 and 72 hours in the boiling water. The test procedures involved quenching samples in cold water, drying and immediately testing for flexural strength.

Properties of the various laminates are given below:

EPOXY—GLASS CLOTH LAMINATES

| Treatment on glass | Total concentration of treating agent, percent | Flexural strength (p.s.i. X10³) boiling water at— | | | |
|---|---|---|---|---|---|
| | | Dry | 2 hrs. | 48 hrs. | 72 hrs. |
| $(CH_3O)_3Si(CH_2)_3NH(CH_2)_2NH_2$ plus— | | | | | |
| $(NH_4)_3ZrOH(CO_3)_3$ | 0.5 | 73.4 | 72.1 | 65.1 | |
| $ZrOOHCl$ | 0.5 | 78.6 | 72.4 | 45.8 | |
| $ZrO(NO_3)_2$ | 0.5 | 78.0 | 69.7 | 44.4 | |
| $ZrOCl_2$ | 0.5 | 7.77 | 78.3 | 60.6 | |
| $H_2ZrO_2(C_2H_3O_2)_2$ | 0.5 | 79.9 | 74.3 | 57.4 | |
| $H_2ZrO_2(C_2H_3O_2)_2$ | 0.1 | 80.0 | 72.5 | 51.4 | 42.5 |
| $(NH_4)_3ZrOH(CO_3)_3$ | 0.1 | 84.0 | 80.6 | 61.8 | 54.0 |
| $CrCl_3$ | 0.5 | 58.0 | 55.0 | | |

This data demonstrates the enhanced laminates strength obtained when the glass cloth is treated with a combination of the zirconyl salts and gamma-trialkoxysilylpropylamine.

EXAMPLE 3

Certain of the 0.5 percent solutions in Example 2 were used to treat additional glass samples. These glass samples were laminated with a commercially available phenolic resin. Laminates were prepared in the same manner as described above and cured under the same conditions. These phenolic resin-treated glass laminates were compared with a laminate formed from untreated glass and the same phenolic resin. The table below relates the strength obtained to the various glass treatments utilized.

Phenolic - Glass Cloth Laminates

| Treatment on Glass $(CH_3O)_3SiCH_{2,3}NHCH_{2,2}NH_2$ Plus | Flexural Strength (p.s.i. X 10³) | | |
|---|---|---|---|
| | Dry | Boiling Water 2 Hr. | 48 Hr. |
| $ZrOCl_2$ | 81.6 | 66.8 | 50.0 |
| $H_2ZrO_2(C_2H_3O_2)_2$ | 78.5 | 65.9 | 57.5 |
| $(NH_4)_3ZrOH(CO_3)_3$ | 77.8 | 69.0 | 57.6 |
| $ZrO(NO_3)_2$ | 86.9 | 69.5 | 52.7 |
| $ZrOOGCl$ | 85.3 | 70.0 | 48.3 |
| None | 64.0 | 42.0 | 22.0 |

These results shown the superior strength obtained by the practice of the invention. It will be noted that the untreated glass results in a very great loss in strength after 48 hours in boiling water, while the treated glass laminates exhibit a considerable retention of this wet strength.

Reasonable modification and variation are within the scope of the invention which sets forth an improved method for increasing the strengths of a reinforced organic resin composite.

That which is claimed is:

1. A method of improving the bond strength between a solid inorganic material and an organic resin which is capable of reacting with amino radicals, said method comprising the steps of (1) contacting the inorganic material, prior to bonding, with an aqueous solution consisting essentially of from 0.1 to 5 weight percent of a mixture of 1 to 10 molar parts of a water-soluble zirconyl salt and 1 to 10 molar parts of a water-soluble gamma-trialkoxysilylpropylamine; (2) drying the treated inorganic material; and (3) bonding said organic resin to the treated inorganic material.

2. The method of claim 1 wherein the solid inorganic material is fibrous glass.

3. The method of claim 1 wherein the amine is of the formula $(CH_3O)_3Si(CH_2)_3NH-CH_2CH_2NH_2$.

4. The method of claim 1 wherein the zirconyl salt is $H_2ZrO_2(C_2H_3O_2)_2$.

5. The method of claim 1 wherein the zirconyl salt is $(NH_4)_3ZrOH(CO_3)_3$.

6. The method of claim 1 wherein the zirconyl salt is $ZrO(OH)Cl$.

7. The method of claim 1 wherein the solid is fibrous glass, the organic resin is an epoxy resin and the amine is of the formula $(CH_3O)_3Si(CH_2)_3NH-CH_2CH_2NH_2$.

\* \* \* \* \*